June 3, 1969  M. M. McQUEEN  3,447,768
LIFTING BODY EXTERNAL FUEL STORES
Filed Feb. 8, 1967  Sheet 2 of 2
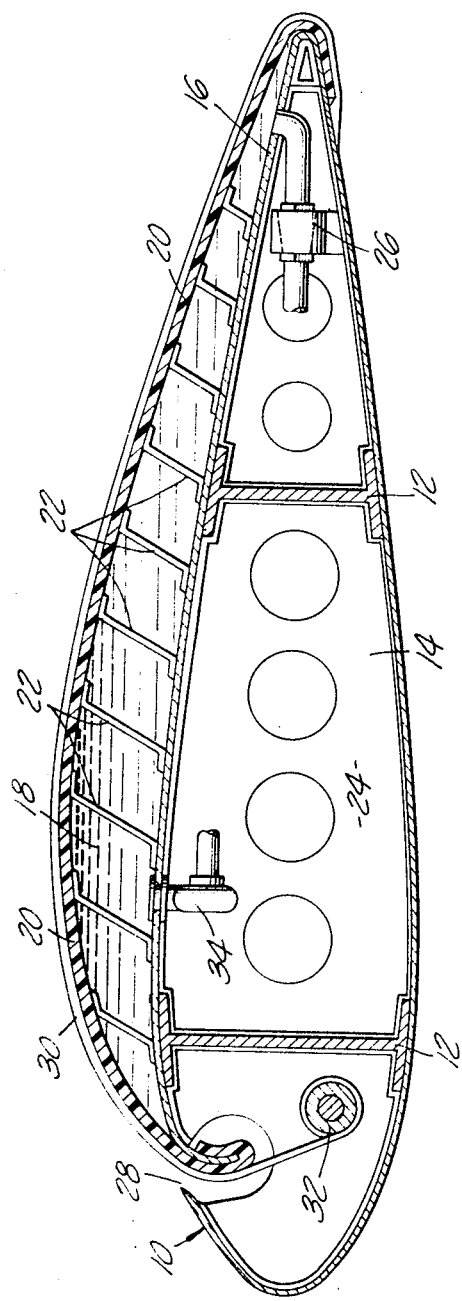
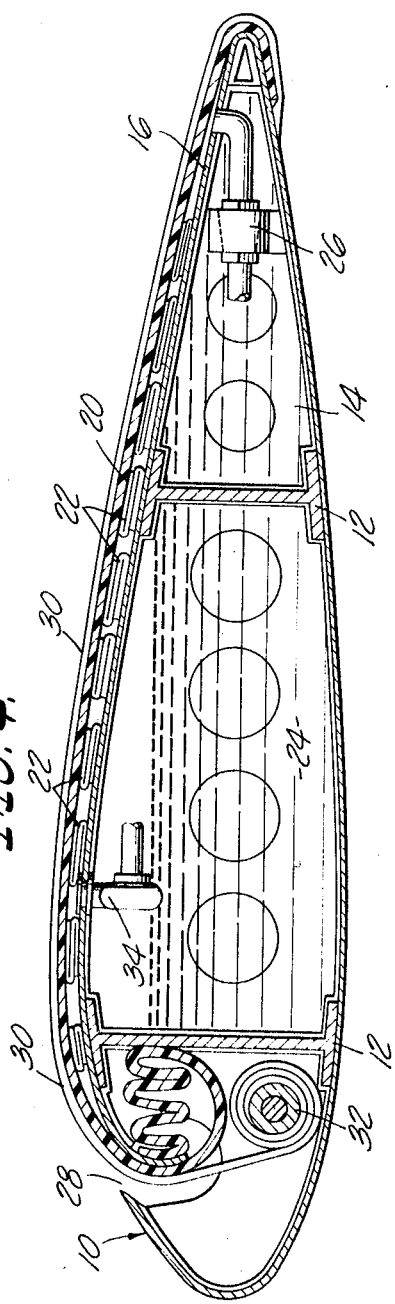
INVENTOR.
MALCOLM M. McQUEEN
BY Lyon & Lyon
ATTORNEYS

United States Patent Office 3,447,768
Patented June 3, 1969

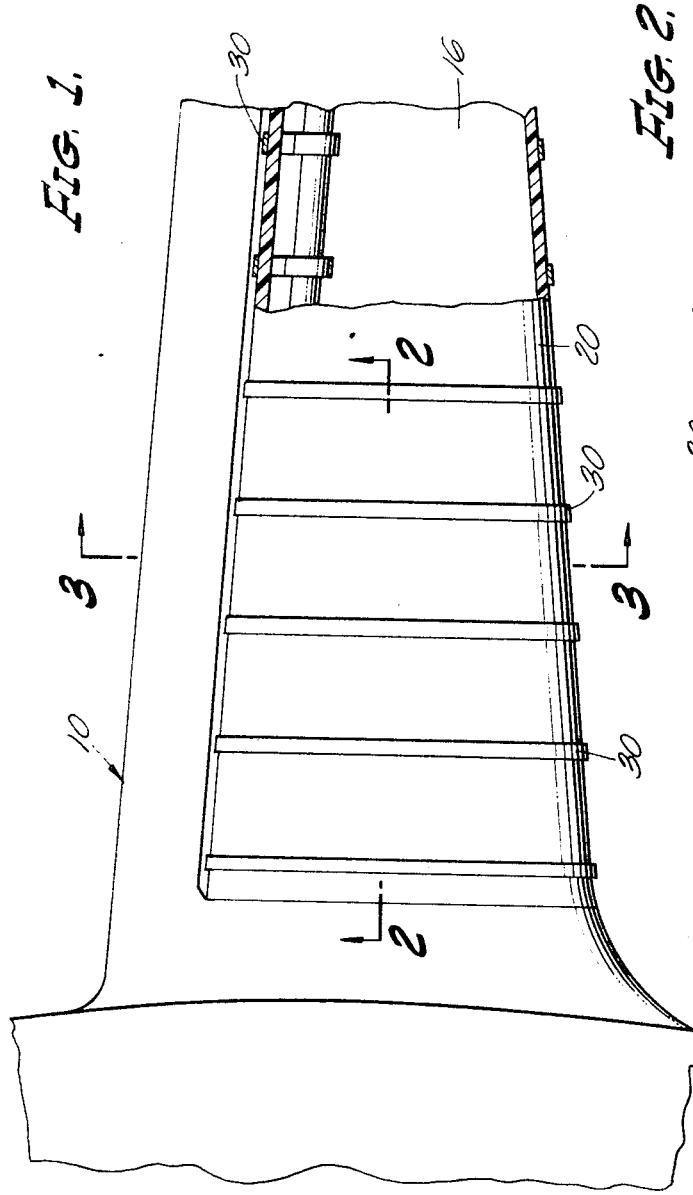
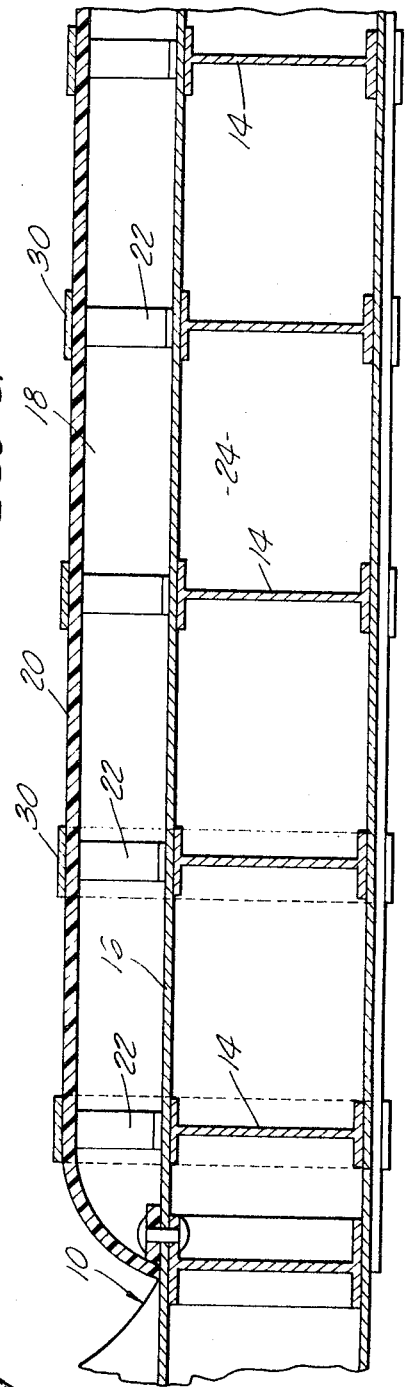

3,447,768
LIFTING BODY EXTERNAL FUEL STORES
Malcolm M. McQueen, Northridge, Calif., assignor to Whittaker Corporation, Los Angeles, Calif., a corporation of California
Filed Feb. 8, 1967, Ser. No. 614,704
Int. Cl. B64d 37/06; B64c 3/48, 3/14
U.S. Cl. 244—135           3 Claims

ABSTRACT OF THE DISCLOSURE

This invention relates to a novel wing structure for an aircraft to provide lifting body external fuel stores and a variable ratio of the wing thickness to the wing cord.

Background of the invention

In general, an airplane is most heavily burdened with fuel or disposable ordnance at take-off. It is at this time that a wing having a high ratio of wing thickness to wing cord would be of particular advantage in increasing the total lift. One means of increasing the low speed lift of high speed aircraft is to change the sweep angle of the wings. However, this approach is fraught with many difficulties since the entire wing load must pass through a hinge structure. At the same time, it is often desirable to provide additional fuel capacity on the plane. Various techniques have been suggested for the provision of external or auxiliary fuel stores on aircraft. External fuel tanks have been provided in the form of external attachments to the fuselage or the wings. Many of these external fuel stores were designed to be disposed of upon use. Fuel tanks of this type cause supply and logistics problems, because they are bulky to ship and handle, and since they are consumed with every flight, must be replaced after each usage. In order to overcome this problem several proposals have been made including the use of a large bag in the bomb bay of the fuselage. In practice, the bag would contain fuel which was used first. Thereafter, when the bag was empty the bag could be reefed into the plane and the bomb bay door closed, thus readying the plane for the high speed run over the target area. Collapsible external stores and internal stores have also been proposed for pylon racks, or cheek cells. All of these proposed stores are presently used. However, external stores detract from the aerodynamic performance of the vehicle. Moreover, none of the known fuel stores are adapted to provide any increase in the wing lift, or to otherwise beneficially alter the ratio of wing thickness to wing cord.

In contrast thereto, the present invention provides a wing having a variable ratio of wing thickness to wing cord with a collapsible, but rigid surface in the form of a collapsible fuel store on either the top or the bottom of the lifting surface to increase the lift. According to the wing design of the present invention, there is also provided an additional volume of fuel which can be collapsed for high speed flight.

A major advantage of the present invention is the increasing of low speed aerodynamic lift more simply than can be done by: (a) increasing the sweep of the wing; and (b) flaps, slats or other movable but rigid air foils. The benefits of using collapsible fuel stores on the wings are several: (1) increased lift at low speed; and (2) the provision of additional fuel. Both beneficial effects occur simultaneously, as greater lift is available just when the aircraft needs it most, that is, when it is accelerating towards take-off with its heaviest load. The fuel cells utilized in the present invention can optionally be redeployed for inflight refueling or for low speed flight, if desired. It is not a requirement that sufficient fuel be on board to fill the cells as they can be deployed by pressurizing them with air.

Accordingly, it is a principal object of the present invention to provide a novel wing having a variable ratio of wing thickness to wing cord and having a collapsible surface on either the top or bottom of the wing.

It is also an object of the present invention to simultaneously provide such a wing having a variable ratio of wing thickness to wing cord also containing a volume of additional fuel which is available during take-off or during other desired times, and yet is capable of being collapsed for high speed flight.

It is yet another object of this invention to provide novel means for simultaneously providing a variable ratio of wing thickness to wing cord and auxiliary fuels stores.

More specifically, it is an object of this invention to provide a novel airplane wing construction having on at least one surface thereof an externally aerodynamically smooth collapsible auxiliary fuel store, means for fluid communication between said auxiliary fuel store and the main storage system of the aircraft, said fuel store being capable of providing a different ratio of wing thickness to wing cord when fully loaded with fuel as compared to the same ratio when the fuel in the auxiliary fuel store has been removed therefrom.

These and other objects and advantages of the invention will become more apparent from the detailed description which follows, taken in conjunction with the accompanying drawings in which:

FIGURE 1 is a top view of the novel wing of the present invention with parts broken away for clarity of illustration;

FIGURE 2 is a section view taken along the line 2—2 of FIGURE 1;

FIGURE 3 is a sectional view taken along the line 3—3 in FIGURE 1.

FIGURE 4 shows the structure of FIGURES 1–3 wherein the upper wing surface has been collapsed to change the ratio of wing thickness to wing cord.

Summary

Briefly, the present invention comprises a novel airplane wing construction having on at least one surface thereof an externally aerodynamically smooth collapsible auxiliary fuel store in fluid communication with the main fuel storage system of the aircraft, said fuel store being capable of providing a different ratio of wing thickness to wing cord when loaded with fuel as compared to the same ratio when the fuel in the auxiliary fuel store is exhausted.

Preferred embodiments

Turning to the drawings, the novel wing design of the present invention as shown in FIGURES 1–4 comprises wing 10 having the normal spars 12 running the length thereof, and the conventional ribs 14 running the width thereof. The wing may also be equipped with flaps (not shown) of the type normally used on aircraft. Covering the wing construction is the skin 16. The innovation in the present invention comprises the auxiliary fuel store which in the preferred embodiment is located on the upper surface of skin 16. This comprises a fluid tight compartment 18 directly overlying the skin 16. The upper surface of the wing and the closure for compartment 18 is provided by skin 20. The skin 20 is attached to skin 16 by straps 22. The use of the straps 22 is a preferrable embodiment of this invention, since the straps function when there is fuel in the auxiliary store to equalize the transmission of the lifting force on skin 20 to the skin 16, which, in turn, is connected to the main load-bearing components of the wing. The auxiliary fuel store in the compartment 18 is in fluid communication with the main fuel area 24 in the wing 10 by valve 26. As is shown in FIGURE 3, the collapsible compartment 18 may be filled with fuel, causing the ratio of the wing thickness to wing cord to be altered as the result of the movement of the skin 20 away from skin 16. As the fuel is used the skin 20 and compartment 18 deform gradually against the skin 16 of the wing to form the contour shown in FIGURE 4. The slip joint 28 is provided at the one wing edge in order to take up the slack as the outer skin 20 is normally maintained against the skin 16 when the auxiliary fuel stores have been used or transferred to the main fuel tank by the application of vacuum to this space and by the taking up of straps 30 on rotatable drum 32. The vacuum may be provided by vacuum pump 34.

In operation, fuel is first added to the wing. With the valve 26 open, the fuel pases from the auxiliary tank into the main wing tanks and eventually fills both the main and auxiliary tanks as shown in FIGURE 3. Once the main and auxiliary tanks are completely filled with fuel, the ratio of wing thickness to wing cord is altered due to the bulging of the upper surface. In this condition, the wing has a greater lifting capacity which is useful particularly for low speed operations such as landing and take-off. Once the plane has left the ground and it becomes desirable to modify the ratio of wing thickness to wing cord in order to minimize drag at high speed operation, the valve 26 can be opened in order to permit the fuel in the auxiliary tank to flow into the main wing tank. This will permit the outer skin 20 of the wing to be collapsed against the main wing skin 16 by the taking up of straps 30 on drum 32 and thereby change ratio of wing thickness to wing cord to that which is optimum for high speed cruising. On the other hand, it will be understood that if it is desired to maintain a take-off ratio of wing thickness to wing cord for prolonged period, the fuel in the main fuel tanks may be used first, leaving the fuel in the auxiliary tank until such time as it is desired to alter the ratio of wing thickness to wing cord. These variations in the operation of the device of the present invention may be accomplished by appropriate electrical or mechanical manipulation of the valve 26 as will be apparent to those skilled in the art.

As can be seen from the foregoing description, the present invention provides a wing in which the ratio of wing thickness to wing cord can be varied in conjunction with auxiliary fuel stores. By the present invention, an airplane can be made more flexible in operation, i.e., greater load lifting, shorter take-off and long range, without any fundamental re-engineering of the basic aerodynamic structure or modification of power plants. Thus, the present invention will find application in all types of aircraft, particularly where efficient high performance operation is required over a wide range of conditions. The invention is of particular application to military aircraft of the type required to carry great bomb loads over extended ranges.

Having fuly described the invention, it is intended that it be limited only by the lawful scope of the present claims.

I claim:

1. A novel airplane wing construction having a variable ratio of wing thickness to wing cord comprising a wing having conventional spar and rib structure, an upper fixed skin connected to and covering said structure, overlying said upper fixed skin an outer skin, said outer skin being movable with respect to and collapsible against said upper fixed skin and forming therebetween an auxiliary fuel store, flexible connecting means having an end thereof attached to said upper fixed skin and the other end attached to said outer skin to distribute the lifting force on said outer skin over the spar and rib structure, a slip joint along the leading edge of the wing to take up any slack in said outer skin, means communicating the interior of said store with the main fuel storage system within the spar and rib structure, whereby the amount of fuel in said auxiliary fuel store alters the ratio of wing thickness to wing cord.

2. A novel airplane construction having a variable ratio of wing thickness to wing cord comprising a wing having a conventional spar and rib structure, an upper fixed skin connected to and covering said structure, overlying said upper fixed skin an cuter skin, said outer skin being movable with respect to said fixed skin and forming therebetween an auxiliary fuel store, flexible connecting means having an end thereof attached to said upper fixed skin and the other end attached to said outer skin to distribute the lifting force on said outer skin over the spar and rib structure, a slip joint along the leading edge of the wing to take up any slack in said outer skin, means communicating the interior of said store with the main fuel storage system within the spar and rib structure, whereby the amount of fuel in said auxiliary fuel store alters the ratio of wing thickness to wing cord, and means for retaining said outer skin against said upper skin when the fuel in the auxiliary fuel stores has been removed therefrom.

3. A novel airplane wing construction having a variable ratio of wing thickness to wing cord comprising a wing, overlying the upper skin of said wing, a collapsible auxiliary fuel store, means communicating the interior of said store with the main fuel storage system within the wing of the aircraft, a slip joint along the leading edge of said wing, within the leading edge of said wing rotatable means to permit the taking up of slack in said store when the fuel has been removed therefrom, and means along the trailing edge of the wing to maintain said store stretched under tension along the upper surface of said wing when the fuel has been removed therefrom.

References Cited

UNITED STATES PATENTS

| 2,806,665 | 9/1957 | Gibson | 244—135 |
| 2,932,470 | 4/1960 | Edkins | 244—44 |
| 3,136,501 | 6/1964 | Barber | 244—44 |
| 3,158,338 | 11/1964 | Cushman | 244—44 |

MILTON BUCHLER, *Primary Examiner.*

J. L. FORMAN, *Assistant Examiner.*

U.S. Cl. X.R.

244—44